United States Patent [19]

Saunders et al.

[11] 4,354,691

[45] Oct. 19, 1982

[54] WHEEL CHAIR PROPULSION SYSTEM

[75] Inventors: Gerald A. B. Saunders, Bath, Canada; Philip J. Lowe, Whitley Bay, England

[73] Assignee: Queen's University at Kingston, Kingston, Canada

[21] Appl. No.: 182,128

[22] Filed: Aug. 28, 1980

[30] Foreign Application Priority Data

Aug. 31, 1979 [CA] Canada .................................. 334875

[51] Int. Cl.$^3$ ................................................ B62M 1/16

[52] U.S. Cl. .............................. 280/242 WC; 280/244

[58] Field of Search ............... 280/242 WC, 244, 246, 280/253, 255; 297/DIG. 4

[56] References Cited

U.S. PATENT DOCUMENTS

| | | | |
|---|---|---|---|
| 1,317,360 | 9/1919 | Dutmer | 280/246 |
| 3,189,368 | 6/1965 | Petersen | 280/242 WC |
| 3,309,110 | 3/1967 | Bulmer | 280/242 WC |
| 3,623,748 | 11/1971 | Haynes | 280/242 WC |
| 3,869,146 | 3/1975 | Bulmer | 280/242 WC |
| 3,877,725 | 4/1975 | Barraza | 280/242 WC |

*Primary Examiner*—Joseph F. Peters, Jr.
*Assistant Examiner*—Donn McGiehan
*Attorney, Agent, or Firm*—Stanley E. Johnson; Richard J. Hicks

[57] ABSTRACT

A wheel chair propulsion device particularly for use by quadriplegics that includes an annular ring smaller in diameter than the large wheel of a conventional wheel chair and having a plurality of spaced apart recesses in a surface thereof. The ring is fastened to the wheel of the wheel chair in co-axial relation therewith and spaced outward therefrom. A lever is pivotally mounted on the wheel chair axle and an opposite end of the lever projects above the conventional arm rest on the wheel chair. A drive mechanism is mounted on the lever arm and positively engageable with the annular ring for rotating the same and disengageable therefrom to allow free rotation of the wheel. The drive mechanism comprises a lug movable into and out of the recesses in the ring in response to movement of the lever in a direction transverse to the plane of the wheel and resilient compressible means which is compressed by movement of the lever in a direction to move the lug into a recess in the ring.

5 Claims, 3 Drawing Figures

WHEEL CHAIR PROPULSION SYSTEM

This invention relates to improvements in occupant operated propulsion systems for wheel chairs and wheel chairs incorporating the same.

Wheel chairs are generally driven by gripping hand wheels attached to the supportive wheels and positioned laterally outward thereof. Paraplegics having full control of arms and upper body muscles can quite satisfactorily propel themselves by gripping the hand rims. It provides excellent exercise as well as a convenient means of propelling the chair to move from one location to another. Quadriplegics on the other hand, may have some ability to move the upper part of the body and the arms but not sufficient control to grip and turn the hand wheels. While motorized wheel chairs can be operated by quadriplegics there are a number of disadvantages associated therewith. Apart from the obvious increase in cost of an electric wheel chair, there are limitations on its use because of its weight and size, the need for recharging and the increased maintenance costs. Additional personal factors involved are the psychological aspect of being dependent upon some motorized transport and a lack of exercising.

There have been a number of devices proposed for use on wheel chairs to facilitate occupant propulsion of the chair but in most instances they are deemed undesirable structures and/or difficult to use by quadriplegics. Obviously, any means used to overcome the problem must allow for the possibility of forwards and backwards motion, unimpeded transfer to and from the wheel chair, some kind of friction braking to allow gradual descent down an incline and flexibility to accommodate the various disabilities. As examples of various known devices reference may be had to the following United States Patents as well as generally to the prior art which may be found in the U.S. Patent Office Classification Class 280, Subclass 242; U.S. Pat. Nos. 3,623,748 issued Nov. 30, 1971 to Dewey O. Haynes; 3,869,146 issued Mar. 4, 1975 to Donald L. Bulmer; 3,877,725 issued Apr. 15, 1975 to Herbert Barroza; 3,189,368 issued June 15, 1965 to James F. Petersen; 3,309,110 issued Mar. 14, 1967 to Donald L. Bulmer.

In the foregoing prior art devices a lever arm is pivotally attached to the axle of each wheel and associated with each lever arm is a drive mechanism that cooperates with the wheel of the chair. The drive mechanisms are of a wedge and friction type. The effectiveness of such drive mechanism is dependent upon tire condition and generally are considered unsatisfactory. Problems are encountered with such type drive mechanisms when going up a ramp moving a heavy person. Jamming also occurs and as the tires wear, which they do, they become relatively inefficient. The movements and motions required of the occupant to move the chair are not always in keeping with the capabilities of quadriplegics nor the desired movements for proper exercise.

A principal object of the present invention is to provide an occupant operated propulsion system employing a positive drive mechanism that is simple to operate and provides appropriate movements and motion for effective exercising.

In accordance with one aspect of the present invention there is provided a wheel chair propulsion device comprising:

(a) an annular ring, smaller in diameter than the large wheel of a conventional wheel chair and having a plurality of spaced apart recesses in a surface thereof;

(b) means for fastening said ring to the large wheel of the wheel chair in co-axial relation therewith and spaced outboard therefrom;

(c) lever means having one end thereof adapted for pivotal mounting on an axle mounting the large wheel on the wheel chair and an opposite end that projects above a conventional arm rest on the wheel chair;

(d) a drive mechanism mounted on said lever arm and positively engageable with said annular ring for rotating the same and disengageable therefrom to allow free rotation of the large wheel when the ring is mounted on the wheel chair wheel, said drive mechanism comprising a lug movable into and out of the recesses in the ring in response to movement of the lever means in a direction transverse to the plane of the wheel.

In accordance with a further aspect of the present invention there is provided a wheel chair having a propulsion device as defined in the foregoing paragraph on each of the large wheels thereof.

The invention is illustrated by way of example in the accompanying drawings wherein.

Figure 1:
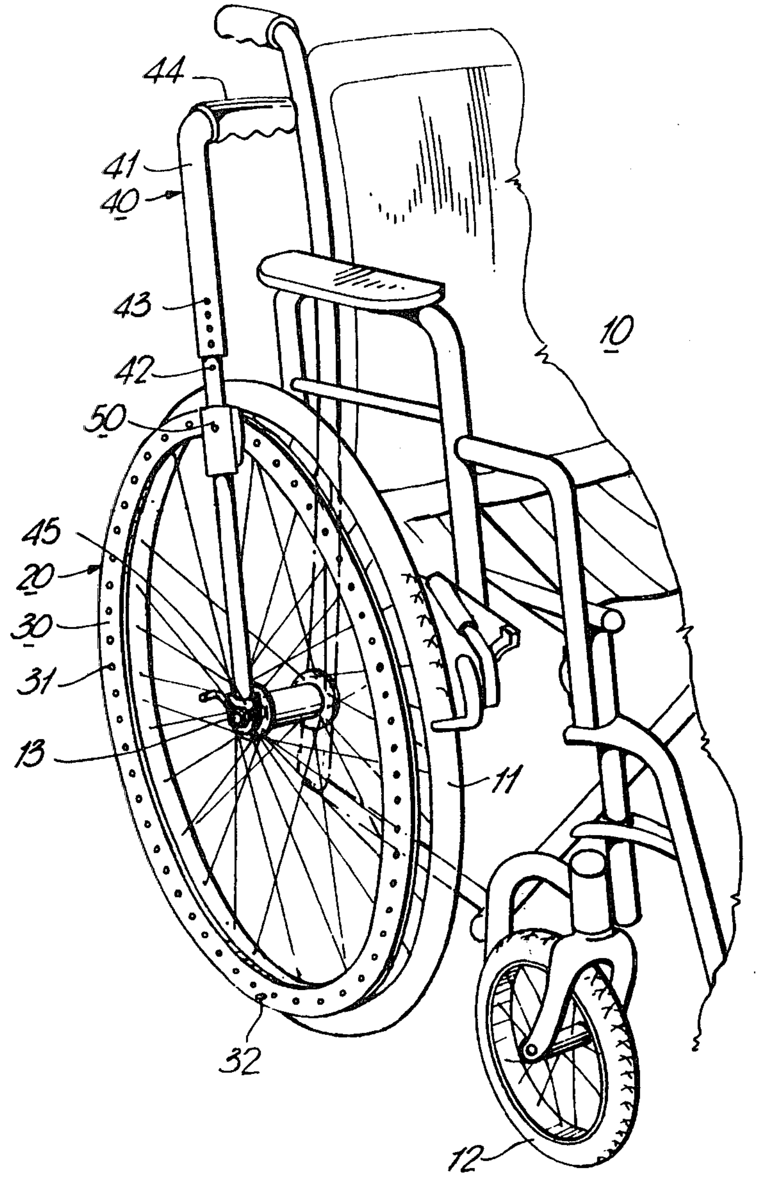
FIG. 1 is an oblique view of a portion of a wheel chair incorporating applicants' occupant operated propulsion mechanism.

Referring to the drawings there is illustrated in FIG. 1 a portion of a wheel chair and it is to be understood the other portion is identical but a mirror image of that illustrated. The wheel chair 10 is a conventional type having a pair of large rear wheels 11 and a pair of front caster wheels 12.

In accordance with the present invention there is provided a hand operable, propulsion mechanism 20 for each of the large pair of wheels 11. Each propulsion mechanism 20 consists of a flat annular ring 30 attached to and spaced from the wheel, a lever arm 40 pivotally mounted at one end thereof on the axle 13 of the wheel and a positive drive mechanism 50 mounted on the lever arm and cooperating with the annular ring 30.

Figure 2:
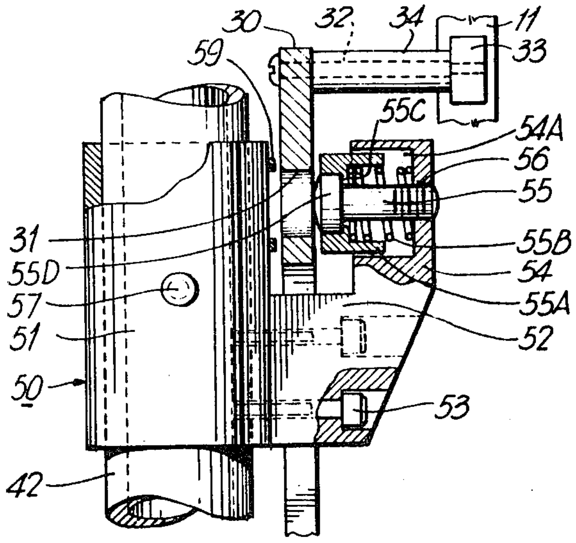
FIG. 2 is a partial sectional view.
Figure 3:
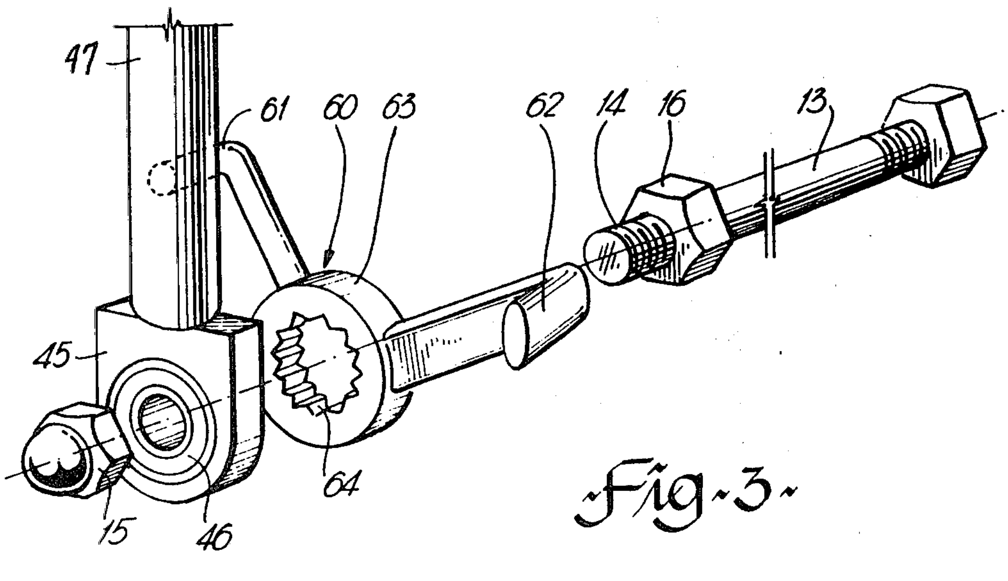
FIG. 3 is an exploded view illustrating the components connecting the wheel chair propelling arm to the axle of the wheel chair.

Referring now, particularly to each of the components, the rim 30 is a flat annular member having a plurality of preferably equally spaced, apertures 31 therethrough or deep recesses therein. The annular ring 30 (see FIG. 2) is mounted on the wheel by studs 32 threaded into lugs 33 secured to the rim of the wheel 11 and held in appropriate, spaced relation from the wheel by spacers 34. As an alternative to the lugs 33, bolts 32 may be anchored to the spokes of the wheel by appropriate clips and/or clamps.

The wheel 11 is journalled for rotation on the axle 13 and such axle is anchored to the frame of the wheel chair in a conventional manner. The outer end of the axle has an extended threaded portion 14 on which the lever arm 40 is journalled for rotation and held in position by a cap-nut 15 that threads onto the axle.

The lever arm 40 has first and second tubular portions 41 and 42 telescopically arranged with respect to one another for varying the length thereof and positionable at various lengths by a pin 43. The pin 43 projects through one of a series of apertures in the lever arm portion 41 and an aperture in lever arm portion 42. The upper end of lever arm portion 41 is turned inwardly toward the occupant of the chair providing a hand grip portion 44. At the opposite end of lever arm 40, lever arm portion 42 is journalled for rotation on the wheel axle extending portion 14 by an adaptor 45 having a bearing 46 in a flattened end portion thereof. A stub shaft 47, on the adapter 45, projects into the end of tubular lever arm portion 42 and is locked thereto by a rivet or pin. In order to limit movement of the arm 40, a stop mechanism 60 is fixed to the shaft 13. The stop mechanism has respective rearward and forward arms 61 and 62 engageable with the lever arm 40 as it is oscillated back and forth on the wheel axle defining respectively rearward and forward movement of the lever arm. The stop mechanism 60 has a hub 63 with an aperture therein, designated 64, suitably formed so as to fit onto a nut 16 on the axle 13 in the same manner as a box-end wrench. Such arrangement permits moving or adjusting the stop mechanism 60 to different positions locating the lever arms 40 in an appropriate easy to use position for different occupants of the wheel chair.

The positive drive mechanism 50 (see FIG. 2) includes a short sleeve 51 having one leg of a reverse L-shaped bracket member 52 secured thereto by two or more threaded studs 53. The other leg of the bracket, designated 54, has a pin or lug 55 threaded therein as indicated at 56 and is so located that it can project into apertures 31 of the annular ring 30 when the lever arm is pushed outwardly transverse to the plane of the wheel by the occupant of the chair. The sleeve 51 is either press-fit onto the tubular member 42 or in sliding fit therewith and retained in appropriate position by a rivet or pin 57. A portion of the ring 30 is located in the gap between the bracket leg 54 and the sleeve 51 with a relatively small clearance on each of opposite faces of the ring. The occupant by pressing outwardly on the arm 40 causes flexing of the arm (or through suitable pivotal movement as may be provided by bearing 46) such that pin 55 projects into an aperture 31 in the annular ring. The occupant then, by moving the lever arm forwardly or backwardly, is able to propel the wheel chair by way of the positive drive mechanism. The occupant, by pulling the arm inwardly toward himself, causes friction pads 59 on the sleeve 51 to engage a face of the annular ring effecting a braking action or, alternatively if desired, a friction drive rather than a positive drive for the wheel.

In order to prevent accidental movement of pin 55 into an aperture 31 there is provided a compressible means on the drive mechanism that is engageable with a side face of the annular ring. The compressible means illustrated in FIG. 2 consists of a sleeve 55A, made preferably of a plastics material, slidably mounted on pin 55. The sleeve 55A is spring biased outwardly from the bracket leg 54 toward the ring 30 by a spring 55B. The sleeve 55A is slidable along the pin 55 into a circular recess 54A in the bracket leg 54 and in order to limit the movement of the sleeve in a direction toward the annular ring, there is a flange 55C internally of the sleeve and which engages a face of the head 55D of the bolt 55. As an alternative the compressible means may be a piece of foam rubber or any readily compressible material located in the gap and secured to the bracket leg 54.

In the embodiment illustrated, apertures 31 extend through the ring from one side face of the ring to the other. It will be obvious however, these need only be spaced apart recesses in a side of the ring that faces the lug or pin 55. Positive engagement can also be effected by notching or having teeth on one or the other of the inner and outer peripheral surfaces of the ring. In the event the outer peripheral surface is notched the positive drive mechanism would have to be inverted with reference to FIG. 2 and the ring mounting bolts 32 moved toward the inner peripheral surface of the ring.

We claim:

1. A wheel chair propulsion device comprising:

(a) an annular ring, smaller in diameter than the large wheel of a conventional wheel chair and having a plurality of spaced apart recesses in a surface thereof;

(b) means for fastening said ring to the large wheel of the wheel chair in co-axial relation therewith and spaced outboard therefrom;

(c) lever means having one end thereof adapted for pivotal mounting on an axle mounting the large wheel on the wheel chair and an opposite end that projects above a conventional arm rest on the wheel chair; and (d) a drive mechanism mounted on said lever arm and positively engageable with said annular ring for rotating the same and disengageable therefrom to allow free rotation of the large wheel when the ring is mounted on the wheel chair wheel, said drive mechanism comprising a lug movable into and out the recesses in the ring in response to movement of the lever means in a direction transverse to the plane of the wheel and resilient compressible means compressed by movement of the lever means in a direction to move the lug into a recess in the ring.

2. A wheel chair propulsion device as defined in chaim 1 wherein said recesses are located on one of the inner peripheral surface, the outer peripheral surface and a side face of the ring.

3. A wheel chair propulsion device as defined in claim 1 wherein said drive mechanism has a gap between which a portion of the annular ring passes, wherein the lug projects into said gap from one side thereof toward one side face of the annular ring and wherein a friction braking material is located on an opposite side of the gap so as to be engageable with an opposite side face of the annular ring.

4. A wheel chair propulsion device as defined in claim 1 wherein said resilient compressible means is located on said drive mechanism and engageable with a side face of said ring.

5. A wheel chair propulsion device as defined in claim 4 wherein said compressible means comprises a sleeve slidably mounted on said lug and spring biased in a direction toward a side face of the annular ring.

* * * * *